(12) United States Patent
Lifshitz et al.

(10) Patent No.: US 11,622,535 B2
(45) Date of Patent: Apr. 11, 2023

(54) PELLET DISPENSER FOR LABORATORY ANIMAL CAGES

(71) Applicant: Arizona Board of Regents on Behalf of The University of Arizona, Tucson, AZ (US)

(72) Inventors: Jonathan Lifshitz, Phoenix, AZ (US); Bret Tallent, Phoenix, AZ (US); Addison Wessel, Phoenix, AZ (US); Loren Matthew Law, Phoenix, AZ (US)

(73) Assignee: Arizona Board of Regents on Behalf of The University of Arizona, Tucson, AZ (US)

( * ) Notice: Subject to any disclaimer, the term of this patent is extended or adjusted under 35 U.S.C. 154(b) by 519 days.

(21) Appl. No.: 16/818,277

(22) Filed: Mar. 13, 2020

(65) Prior Publication Data
US 2020/0205375 A1    Jul. 2, 2020

Related U.S. Application Data

(63) Continuation of application No. PCT/US2018/055216, filed on Oct. 10, 2018.

(60) Provisional application No. 62/571,683, filed on Oct. 12, 2017.

(51) Int. Cl.
*A01K 5/02*    (2006.01)
*A01K 1/03*    (2006.01)

(52) U.S. Cl.
CPC .......... *A01K 5/0291* (2013.01); *A01K 5/0225* (2013.01); *A01K 5/0258* (2013.01); *A01K 5/0275* (2013.01); *A01K 1/031* (2013.01)

(58) Field of Classification Search
CPC .. A01K 5/0291; A01K 5/0225; A01K 5/0258; A01K 5/0275; A01K 1/031; A01K 1/0356
See application file for complete search history.

(56) References Cited

U.S. PATENT DOCUMENTS 2,443,861 A * 6/1948 Johnston ................ A01K 97/04
221/185
2,561,696 A * 7/1951 Hammer ................. G01F 11/18
222/449

(Continued)

FOREIGN PATENT DOCUMENTS

GB    2220552 A * 1/1990    .......... A01K 5/0275
GB    2281494 A * 3/1995    .......... A01K 5/0258

*Primary Examiner* — Ebony E Evans
(74) *Attorney, Agent, or Firm* — Knobbe, Martens, Olson & Bear, LLP

(57) ABSTRACT

Features are described for a pellet dispenser. The pellet dispenser be implemented as a complex molded unit to fit within the home cage of laboratory animals (e.g., hanging from a wall of the cage or inside a food hopper of the cage). The pellet dispenser may be contained within the cage or otherwise attached to the cage so as not to take up additional floor space in the cage which should be allocated for the small laboratory animal. The pellets may be gravity or screw drive fed towards an ejector port. At prescribed times during the day, a prescribed number of pellets may be ejected into the animal cage. Additional components of the pellet dispenser include an ejector (e.g., a linear actuator) and pellet hopper.

17 Claims, 9 Drawing Sheets

(56) References Cited

U.S. PATENT DOCUMENTS

| | | | | |
|---|---|---|---|---|
| 3,578,209 A * | 5/1971 | Fraser | ............... | A01K 5/0291 |
| | | | | 222/650 |
| 3,782,334 A * | 1/1974 | Leon | ................... | A01K 5/02 |
| | | | | 119/51.13 |
| 4,195,594 A * | 4/1980 | Siciliano | ........... | A01K 5/0275 |
| | | | | 119/57.6 |
| 5,351,645 A * | 10/1994 | Brennon | ............ | A01K 39/02 |
| | | | | 119/475 |
| 6,125,082 A | 9/2000 | Reid | | |
| 6,234,111 B1 | 5/2001 | Ulman et al. | | |
| 6,622,655 B2 | 9/2003 | Springett | | |
| 2013/0255579 A1 * | 10/2013 | Sharpe | ................ | A01K 5/00 |
| | | | | 119/51.01 |

\* cited by examiner

PELLET DISPENSER FOR LABORATORY ANIMAL CAGES

INCORPORATION BY REFERENCE TO RELATED APPLICATIONS

Any and all priority claims identified in the Application Data Sheet, or any correction thereto, are hereby incorporated by reference under 37 CFR 1.57. This application is a continuation of PCT Int'l. Appl. No. PCT/US2018/055216, filed Oct. 10, 2018, which claims the benefit of U.S. Provisional Application No. 62/571,683 filed on Oct. 12, 2017. Each of the aforementioned applications is incorporated by reference herein in its entirety, and each is hereby expressly made a part of this specification.

BACKGROUND

Field

The present disclosure is related to pellet dispensers for pharmacological laboratory tests such as those including small animals

Description of Related Art

One goal of biomedical research is to identify or develop and then evaluate pharmacological compounds for therapeutic efficacy in the understanding and treatment of disease. As drug discovery transitions from organic synthesis to laboratory work to human trials, route of administration is a significant challenge to address. Moreover, drugs or treatments that may require multiple or sustained doses over long periods of time come with significant side effects and resource limitations. Traditionally vertebrate animal drugs studies, particularly in rodents (e.g. mice, rats, guinea pigs), administer compounds intra-peritoneally as an injectable solution. Repeated injections can cause callusing at the injection site and generalized stress as the animals are subject to repeated injections. Also, the manual labor for dosing, handling, and attending to animals requires disposable resources and significant personnel involvement.

SUMMARY

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description of the Preferred Embodiment" one will understand how the features of the system and methods provide several advantages over traditional systems and methods.

In one innovative aspect, a pellet dispenser for an animal cage for a small laboratory animal is provided. The pellet dispenser includes a tube having a receiving end including a portal for receiving pellets and a dispensing end including an ejector port for dispensing pellets. The pellets may be solid or semi-solid pellets. The pellet dispenser also includes an upper mounting element affixed to the tube. The upper mounting element attaches at least a portion of the tube to a wall or structure of a cage. The pellet dispenser also includes a base affixed to the dispensing end of the tube. The base includes: a linear solenoid disposed to push a pellet at the dispensing end from within the tube through the ejector port, and a chute to receive the pellet pushed by the linear solenoid and direct the pellet into the cage.

In some implementations of the pellet dispenser, the tube includes a channel or window extending from the receiving end to the dispensing end. At least a portion of the pellets within the tube may be visible through the channel or window.

In some implementations of the pellet dispenser, the linear solenoid may include a controller configured to receive a control message for activating the linear solenoid. The control message may indicate at least one of the following: a time to activate the linear solenoid, a duration for activating the linear solenoid, a number of times to activate the linear solenoid, or a delay between activations of the linear solenoid.

In some implementations of the pellet dispenser, the control message may be received from a dispenser controller configured to concurrently transmit the control message to a plurality of pellet dispensers.

In some implementations of the pellet dispenser, the upper mounting element may present the receiving end of the tube for receiving pellets without direct contact with the cage.

In some implementations of the pellet dispenser, the base may also include a lower mounting element configured to attach at least a portion of the pellet dispenser to a structure within the cage such as a feed hopper.

In another innovative aspect, a pellet dispensing system is provided. The pellet dispensing system includes a pellet dispenser. The pellet dispenser includes a tube having a receiving end including a portal for receiving pellets and a dispensing end including an ejector port for dispensing pellets. The pellet dispenser also includes an upper mounting element affixed to the tube, wherein the upper mounting element attaches at least a portion of the tube to a wall or a first structure of a cage. The pellet dispenser further includes a base affixed to the dispensing end of the tube. The base includes an ejector disposed to push a pellet at the dispensing end from within the tube through the ejector port, and a chute to receive the pellet pushed by the ejector and direct the pellet into the cage.

The pellet dispensing system also includes a pellet dispensing controller that includes a microcontroller configured by instructions stored in a memory. The instructions cause the pellet dispensing controller to receive a control parameter for the pellet dispenser. The control parameter indicates a time to activate the ejector of the pellet dispenser. The instructions also cause the pellet dispensing controller to determine that a current time corresponds to the time identified by the control parameter. The instructions further cause the pellet dispensing controller to transmit an activation message to the ejector of the pellet dispenser.

The tube of the pellet dispenser included in the pellet dispensing system may include a channel or window extending from the receiving end to the dispensing end such that at least a portion of pellets within the tube is visible through the channel or window.

The ejector may be implemented as or include a linear solenoid. The ejector may include a controller configured to receive the activation message for activating the ejector. The activation message may indicate at least one at a time to activate the ejector, a duration for activating the ejector, a number of times to activate the ejector, or a delay between activations of the ejector.

In some implementations of the pellet dispensing system, the pellet dispensing controller may be configured to concurrently transmit the activation message to a plurality of pellet dispensers.

The pellet dispensing system may be configured to dispense a solid or semi-solid pellet.

The upper mounting element of the pellet dispenser included in the pellet dispensing system may present the receiving end of the tube for receiving pellets without direct contact with an area of the cage housing a subject.

The base of the pellet dispenser included in the pellet dispensing system may further include a lower mounting element configured to attach at least a portion of the pellet dispenser to a second structure of the cage. For example, the second structure of the cage may be a feed hopper or a feed hopper grate.

BRIEF DESCRIPTION OF THE DRAWINGS

The following is a brief description of each of the drawings. The drawings disclose illustrative embodiments and particularly illustrative implementations in the context of pellet dispensers. They do not set forth all embodiments. Other embodiments may be used in addition to or instead. Conversely, some embodiments may be practiced without all of the details that are disclosed. It is to be noted that the Figures may not be drawn to any particular proportion or scale.

DETAILED DESCRIPTION OF THE PREFERRED EMBODIMENTS

Features are described for testing compounds in a physical form (e.g., pellet) on a test animal. The compounds may be provided to the animal in a way that reflects how a human subject would take in the compound. The compounds may be provided in a way that minimizes physical and psychological distress to the test animal. For example, physical stress may be caused by handling the animal or repeated injections of the compound under test to the animal. These physical manipulations may also cause psychological distress to the animal. Either form of stress may unduly impact a study. A timed pellet dispenser, with an attached pellet hopper, can schedule the delivery of one or more compound pellets into the home cage of laboratory animals. In this way, compounds at prescribed doses and timing can be delivered to the cage in an unattended manner, through an oral route of administration comparable to the final endpoint of drug development. The unattended pellet dispenser can accelerate translational biomedical research.

The pellet dispenser may be implemented as a complex molded unit to fit within the home cage of laboratory animals (e.g., hanging from a wall of the cage or inside a food hopper of the cage). The pellet dispenser may be contained within the cage or otherwise attached to the cage so as not to take up additional floor space in the cage which should be allocated for the small laboratory animal. The pellets may be gravity or screw drive fed towards an ejector port. At prescribed times during the day a prescribed number of pellets may be ejected into the animal cage. Additional components of the pellet dispenser include an ejector (e.g., a linear actuator) and pellet hopper. The overall device may be custom designed for specific cages (e.g., Lab Products Supermouse 750, Alternative Designs RC71D, Innovive IVC Rat Cage). The ejector may be controlled by an electronic circuit (e.g., timing module) connected to a programmable unit or computer. Additional features may be included such as a feedback unit to determine effective pellet delivery or number of pellets in the hopper. An alert system may be provided to detect and present errors such as low hopper pellet level, incomplete pellet delivery, or a jammed ejector.

As used herein, the term "pellet" generally refers to a solid or semi-solid body. A pellet may be a pill or tablet. A pellet may be spherical, disc, elliptical, or other shape that can be received into a pellet dispenser described herein. In some implementations, the pellet may be an extruded pellet or a moist pellet. In some implementations, the pellets loaded into a pellet dispenser may be homogeneous or may be heterogeneous. The pellet may be specifically manufactured to contain prescribed amounts of compounds (e.g. drugs). The pellet can be of any size or dimension to accommodate the research needs, diameter of the tube, or other research driven parameters.

Figure 1:
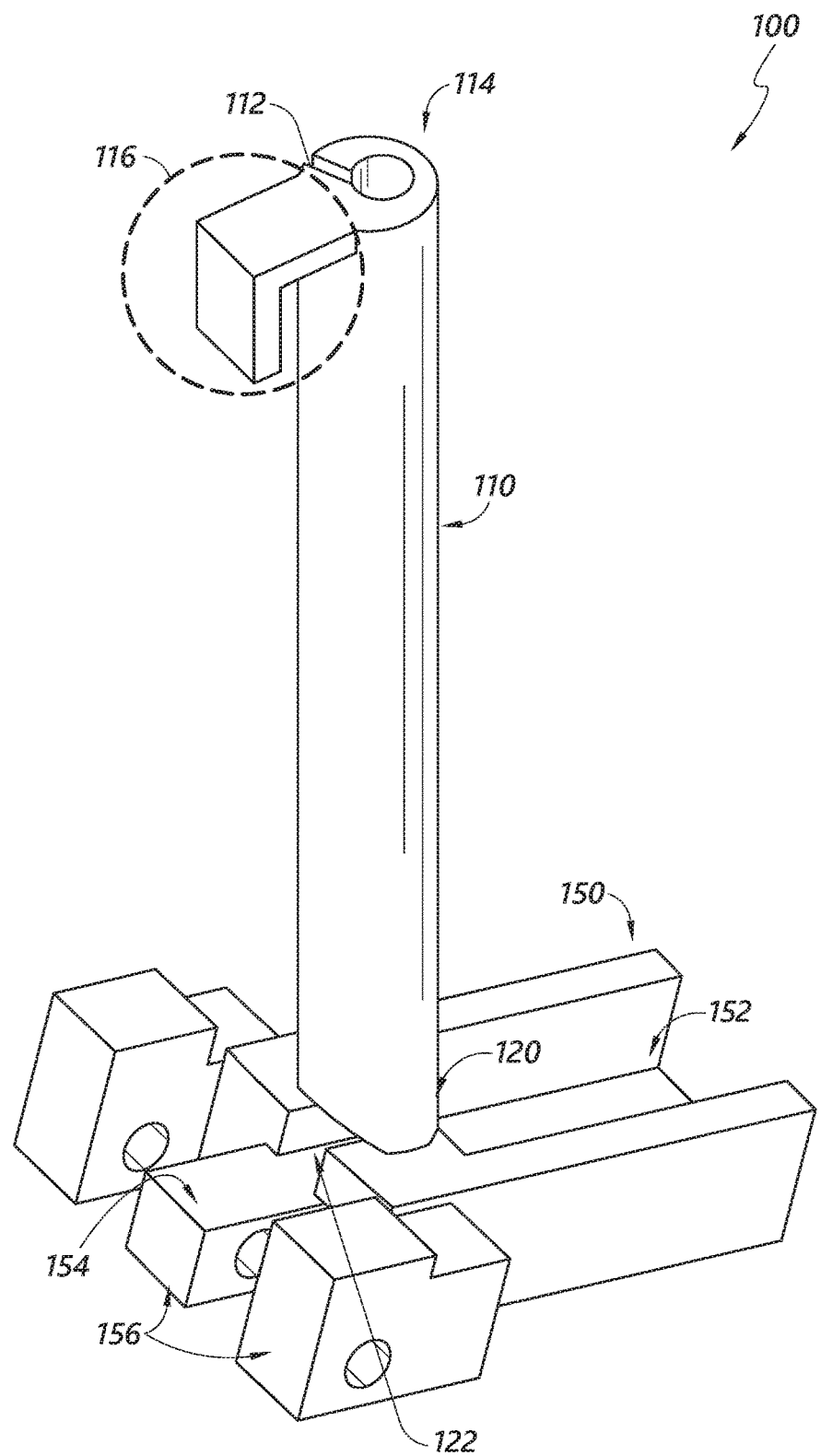
FIG. 1 is an illustration of a pellet dispenser according to an exemplary implementation.

FIG. 1 is an illustration of a pellet dispenser according to an exemplary implementation. The pellet dispenser shown in FIG. 1 includes a tube 110 and a base 150. The tube 110 may be 10 cm long or similar in length to the height of the cage in which it will be installed. For example, the tube 110 may be no taller than the height of the cage in which it will be installed. The tube 110 may have a diameter just greater than the size of the pellet or similar width for housing pellets. The tube 110 may include a channel 112 that allows viewing of pellets within the tube 110, to determine type, number, or orientation. In some implementations, the channel 112 may be an opening in the tube 110 that allows air to flow from the environment into the tube 110. In some implementations, the channel 112 may include a window or other transparent barrier that permits visibility into the tube 110, but does not provide direct access to the pellets within the tube 110.

Pellets may be received at a receiving end 114 of the tube 110. The receiving end 114 may be disposed to allow loading of pellets without the need of disturbing the cage to which the pellet dispenser 100 is attached (e.g., without direct contact with the cage). For example, the tube 110 may be refilled without touching the cage. In some implementations, it may be necessary to remove the cage from a cage rack to refill the pellet dispenser 100. In other implementations, it may be necessary to remove the cage and open an environmental control lid to refill the pellet dispenser 100. However, the pellet dispenser embodiments should permit loading of the tube 110 without disturbing the animal inhabitants of the cage to which the pellet dispenser is attached. That is, the subject(s) housed by the cage need not be interacted with to load the pellet dispenser 100.

Loading the pellet dispenser 100 may include dropping pellets into the receiving end 114 of the tube 110. In some implementations, the receiving end 114 of the pellet dispenser may receive a funnel, magazine, sleeve, or other pellet loading means. In such implementations, the pellet loading means may be portioned in accordance with a research protocol and provided for loading. This can provide further control over the experiment by ensuring the proper pellets are loaded in the proper quantity.

The pellet dispenser 100 may be attached to the cage using an upper mounting element 116. As shown in FIG. 1, the upper mounting element 116 resembles a hook that can latch to a side of the cage or structure therein, such as shown in FIG. 3, 4, 6, or 7. In some implementations, the upper mounting element 116 may include additional or alternative mounting structures such as a friction mount, an adhesive mount, a magnetic mount, or similar means for affixing the pellet dispenser 100 to a cage or other enclosure into which pellets will be dispensed.

The tube 110 also includes a dispensing end 120 from which pellets may be dispensed. The dispensing end 120 may include an ejector port 122 through which pellets may exit an inner-cavity of the tube 110. Accordingly, pellets may be received via the receiving end 114 and dispensed through the dispensing end 120 through the ejector port 122.

The base 150 may be affixed to the tube 110 proximate to the dispensing end 114 to support the tube 110 and, in some implementations, provide additional mount points for the pellet dispenser 100 to attach to the cage. The base 150 shown in FIG. 1 includes an ejector bay 152. The ejector bay 152 may be a cavity for receiving an ejector, such as a linear solenoid, for pushing pellets out of the tube 110.

The base 150 may also include a chute 154. The chute 154 is disposed to receive a pellet pushed by an ejector and direct the pellet into the cage. To help ensure the pellet is delivered into the cage, an angle formed between the chute 154 and the tube 110 may be an obtuse or acute angle.

Figure 3:
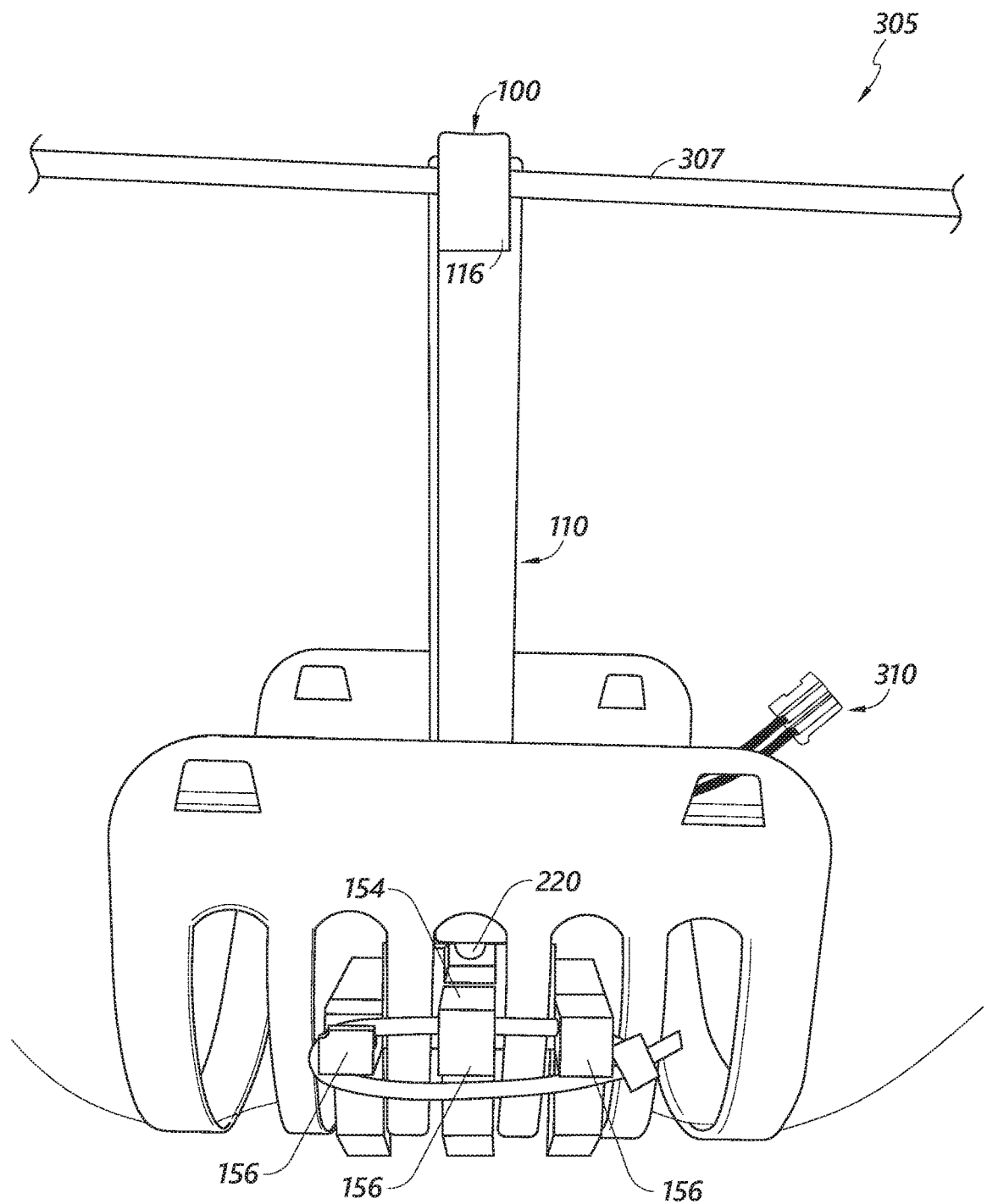
FIG. 3 is an illustration of a pellet dispenser mounted on a cage from the perspective of an animal within the cage.
Figure 7:
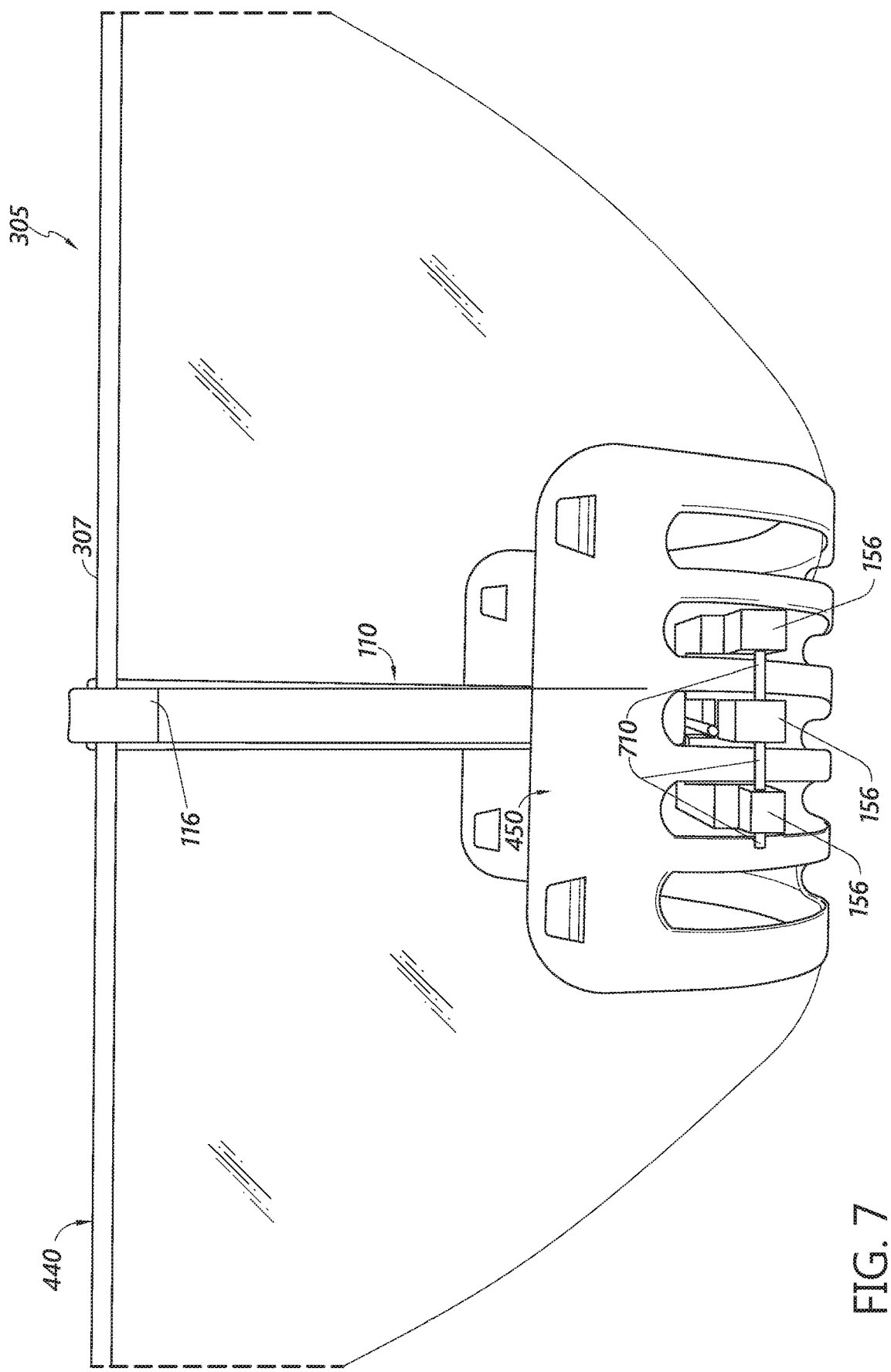
FIG. 7 is an illustration of the pellet dispenser of FIG. 6 from the perspective of an animal within the cage.

The base 150 may include lower mounting element 156 for affixing the pellet dispenser 100 to the cage. As shown in FIG. 1, the lower mounting element 156 includes three prongs which can be fed between feed trough grating or other spaced structures on a cage. Once inserted between the structures, a pin or other fastening means may be inserted through respective pin holes to secure the lower mounting element 156 to the cage structure. FIG. 3 shows the use of a zip tie as the fastening means. FIG. 7 shows the use of a pin as the fastening means.

Figure 2:
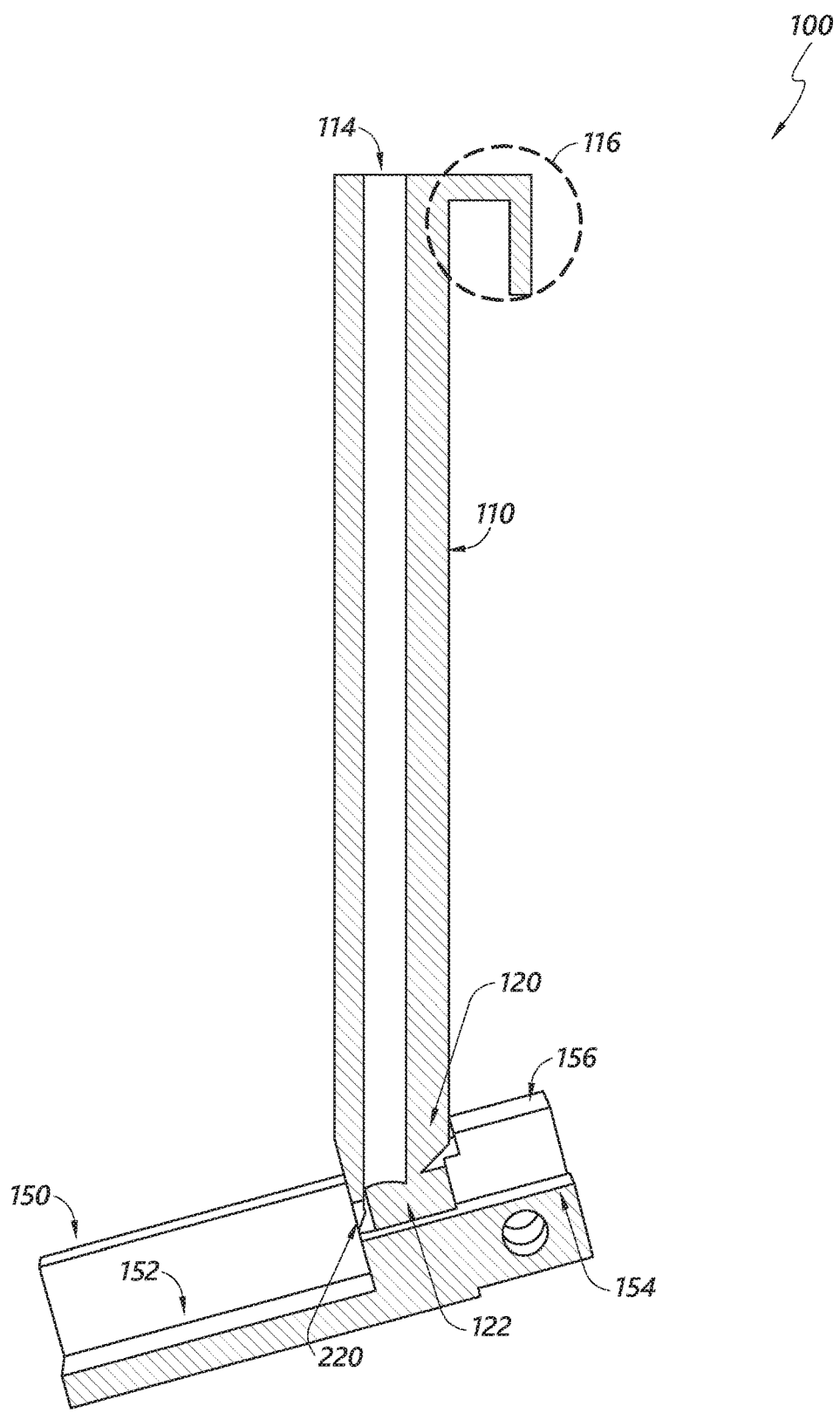
FIG. 2 is a cross-sectional illustration of the pellet dispenser of FIG. 1.

FIG. 2 is a cross-sectional illustration of the pellet dispenser of FIG. 1. The cross-section shows an inner portion of the tube 110 as well as the relationship between the ejector bay 152 and the ejector port 122. An ejector bar port 220 is shown in FIG. 2. The ejector bar port 220 is an opening into which an ejector bar can fit to push pellets through the ejector port 122. Further detail of ejection is described with reference to FIG. 9A and FIG. 9B.

FIG. 3 is an illustration of a pellet dispenser mounted on a cage from the perspective of an animal within the cage. The pellet dispenser 100 is attached to an upper edge 307 of a cage 305. A pellet may be ejected from the ejector port into the cage 305. Also shown in FIG. 3 is a controller adapter 310. The controller adapter allows the ejector (not shown) included in the pellet dispenser 100 to be communicatively connected to a controller (not shown). The controller may provide control messages to activate the ejector. The control message may indicate how many times to activate the ejector, how long to activate the ejector, a delay between ejector activations, or the like. In some implementations, the pellet dispenser 100 may include one or more additional sensors to detect properties of the pellet dispenser (e.g., number of pellets, whether a pellet has been ejected, pellet jamming, fractured pellet, dirt in pellet dispenser unit). For example, a sensor may be mounted to the pellet dispenser 100 (e.g., on the tube 110 or the base 150) or within a structure of the pellet dispenser 100 (e.g., within the chute 154). In some implementations, the pellet dispenser 100 may include an output device such as an audio output or visual output (e.g., LED light, LED display, etc.) to provide feedback. For example, if an ejection error is detected, it may be desirable to provide a perceivable output to draw attention to the error. The output device may be affixed to the pellet dispenser 100 such that the presented information is directed away from the cage thereby avoiding stimulation of the animal housed therein. In some implementations, the output may be provided via a pellet dispensing controller or an external display in data communication with the sensor.

The output may be provided through the controller adapter 310 to the controller. In such implementations, the controller may dynamically adjust the pellet dispenser 100 or other device based on the messages received from the pellet dispenser 100.

Figure 4:
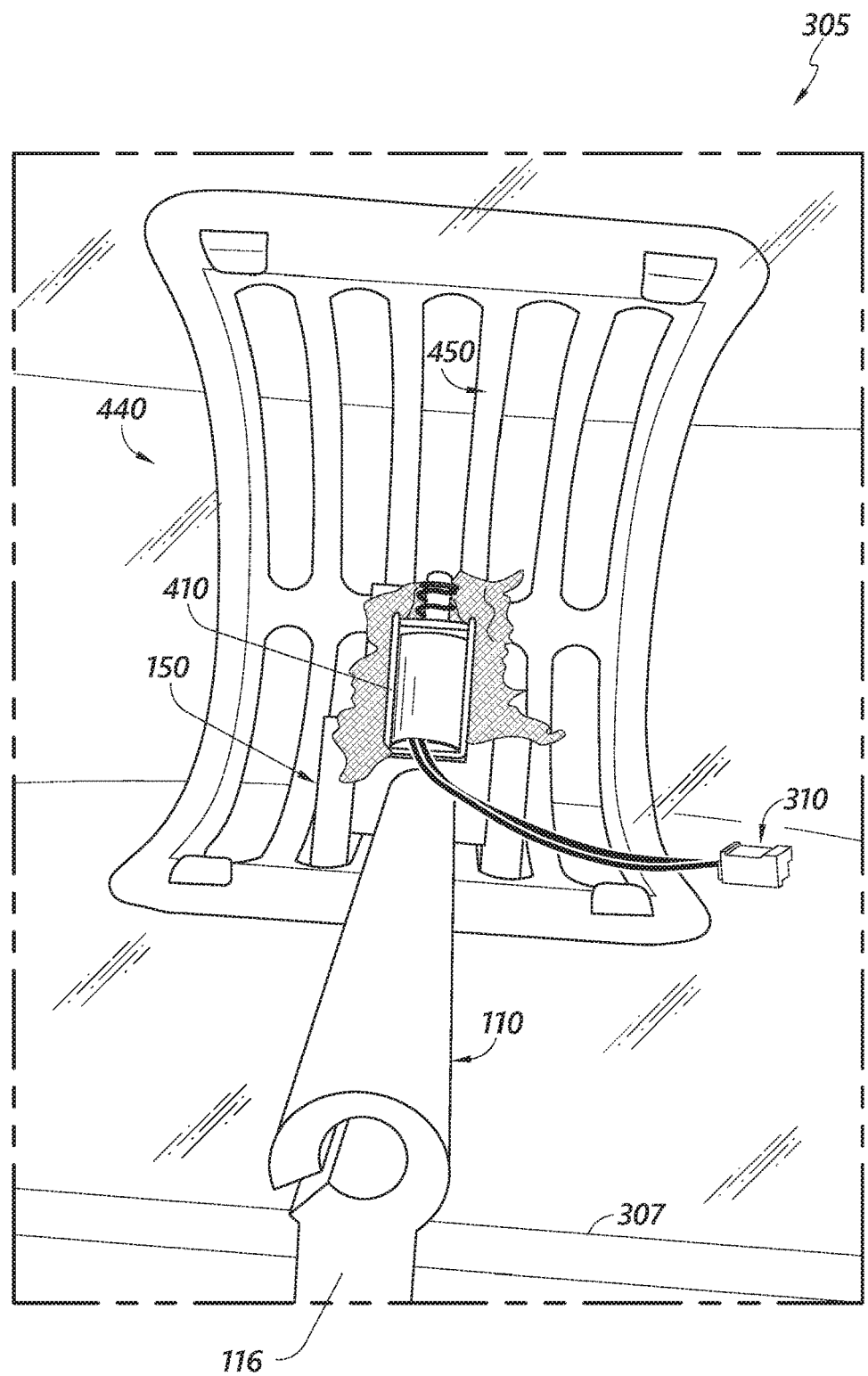
FIG. 4 is an illustration the pellet dispenser of FIG. 3 from an overhead perspective outside the cage.

FIG. 4 is an illustration the pellet dispenser of FIG. 3 from an overhead perspective outside the cage. The ejector 410 shown in FIG. 4 is a linear solenoid. Other examples of ejectors include rotary mechanism, screw drive, gravity release, catapult, or animal retrieval. The ejector 410 shown in FIG. 4 may be is seated on a dampening pad such as a cotton batting or other material to abate vibration or noise during activation of the ejector 410. The dampening pad may be omitted in some implementations such as where the ejector 410 operates in a low noise or vibration mode.

In some implementations, the controller adapter 310 may draw power from the controller. However, in some implementations, it may be desirable to provide power to the ejector 410 from another source such as a battery conductively attached to the ejector 410.

Figure 6:
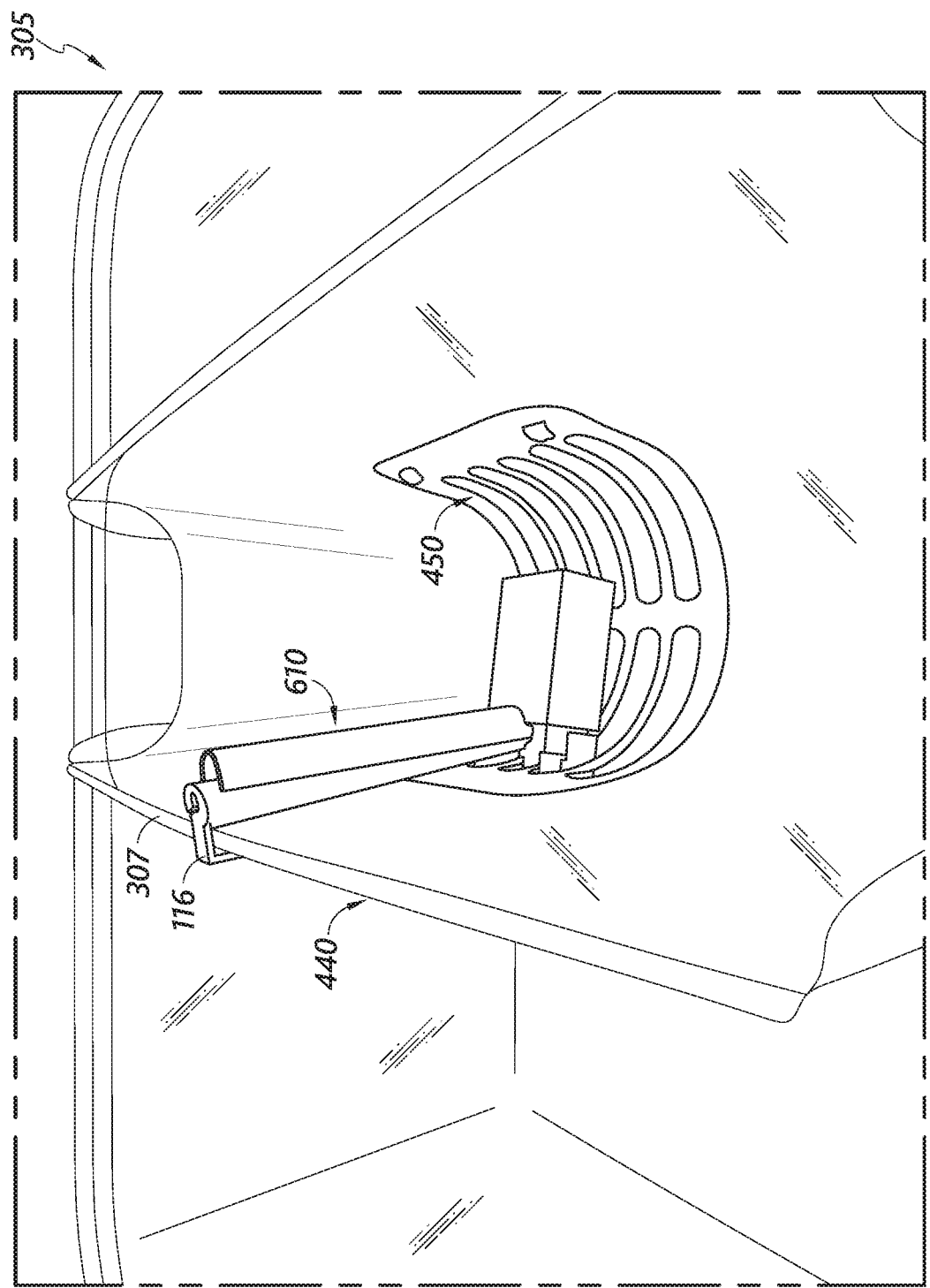
FIG. 6 is an illustration of another pellet dispenser from a side view showing an embodiment mounted inside the food dispenser of the cage.

The overhead view of FIG. 4 illustrates a feed hopper trough 440 mounting for the pellet dispenser. The trough 440 may cross the cage and include a space under the trough sufficient to allow the animal to move about the bottom of the cage. The trough 440 may include a grate 450 to allow food to pass from outside the cage 305 into the cage 305 and provide a mounting structure for the pellet dispenser 100. It will be appreciated that the pellet dispenser 100 may be mounted to other cages or other structures within the cage 305. FIG. 6 provides a wider view of a cage including a pellet dispenser.

Figure 5:
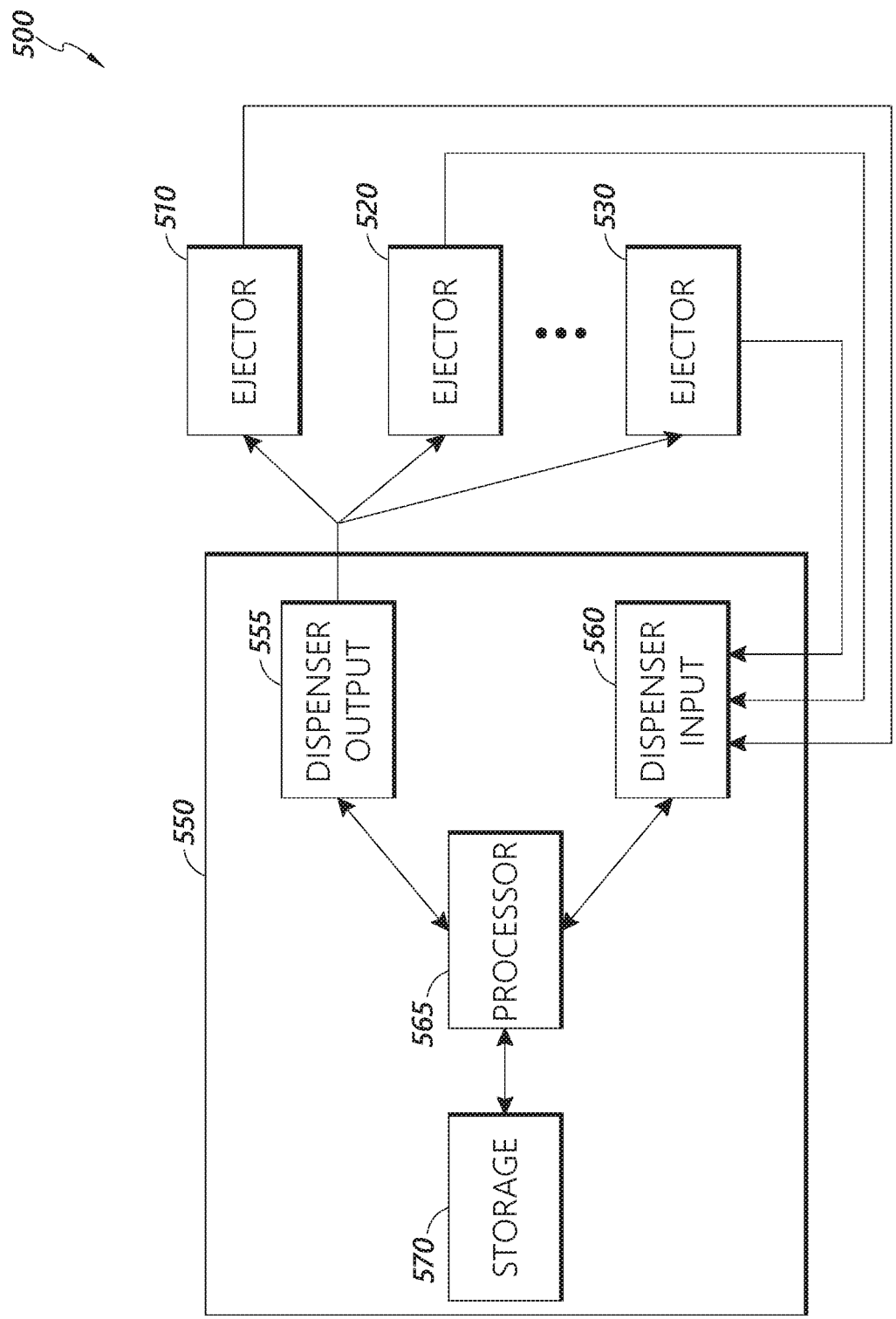
FIG. 5 is a block diagram illustrating a pellet dispensing system according to an exemplary implementation.

FIG. 5 is a block diagram illustrating a pellet dispensing system according to an exemplary implementation. The pellet dispensing system 500 includes a controller 550. The controller 550 includes a processor 565 and a storage 570. The storage 570 may be a memory card or chip, a microprocessor, or other device for storing instructions that cause the processor 565 to perform one or more of the methods described. For example, the processor 565 may transmit an activation message to control one or more ejectors (e.g., ejector 510, 520, or 530) included in respective pellet dispensers. In some implementations, an activation message may be referred to as a control message. A dispenser output 555 may provide a communications path to respective controller adapters for an ejector. In some implementations, it may be desirable to provide the activation message to a set of ejectors at the same time. For example, during laboratory testing of compounds, it may be important to deliver control and test compounds at the same time to avoid the influence of time as a differentiation factor.

In some implementations, the ejector 510, 520, or 530 or other sensor included in the pellet dispenser may provide feedback to the controller 550. A dispenser input 560 may be provided for receiving messages from a dispenser. In some implementations, the dispenser input 560 and the dispenser output 555 may be implemented using a common hardware component such as a USB port, Ethernet port, serial data port, or other hardware for transmitting and receiving messages. In some implementations, the dispenser input or output may include wireless means for transmitting or receiving messages from a dispenser. For example, low power Bluetooth™, near field communication, or other standardized or proprietary messaging protocol may be used to form a communications link between the ejector 510, 520, or 530 and the controller 550.

FIG. 6 from a side view showing an embodiment mounted inside the food dispenser of the cage. The pellet dispenser shown in FIG. 6 includes a cover 610 that encases the ejector bay 152 of the pellet dispenser 100. Also shown in FIG. 6 is the feed hopper trough 440 and how it may extend across the cage.

FIG. 7 is an illustration of the pellet dispenser of FIG. 6 from the perspective of an animal within the cage. As noted above, the pellet dispenser in FIG. 7 is mounted to the feed hopper grate 450 using a pin 710.

Figure 8:
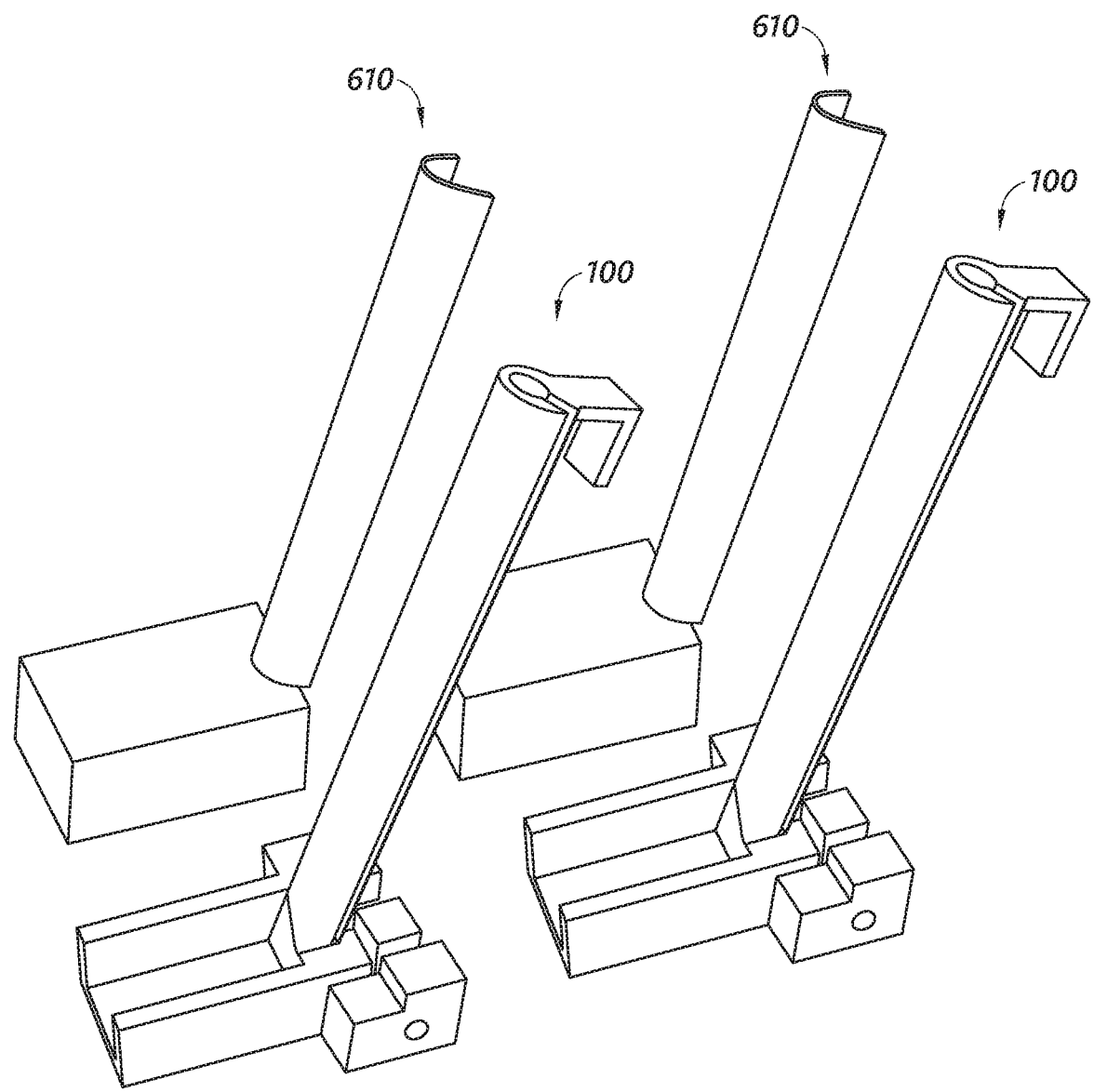
FIG. 8 is an illustration of pellet dispensers and covers according to further exemplary implementations.

FIG. 8 is an illustration of pellet dispensers and covers according to further exemplary implementations. The pellet dispenser may be formed from a rigid material such as a plastic or resin. A pellet dispenser may be manufactured by extrusion, additive manufacturing, subtractive manufacturing, or similar technology as is known art within the field. Materials used to construct the pellet dispenser may be durable, degradable, recycled, or edible, but in no way toxic to laboratory animals. Similar to the pellet dispenser, the cover may be formed from a rigid material such as a plastic or resin. A cover may be manufactured by extrusion, additive manufacturing, subtractive manufacturing, or similar technology as is known art within the field. The cover and pellet dispense need not be formed using the same material or in the same fashion, but, like the materials used for the pellet dispenser, the materials used to construct the cover may be durable, degradable, recycled, or edible, but in no way toxic to laboratory animals.

Figure 9A:
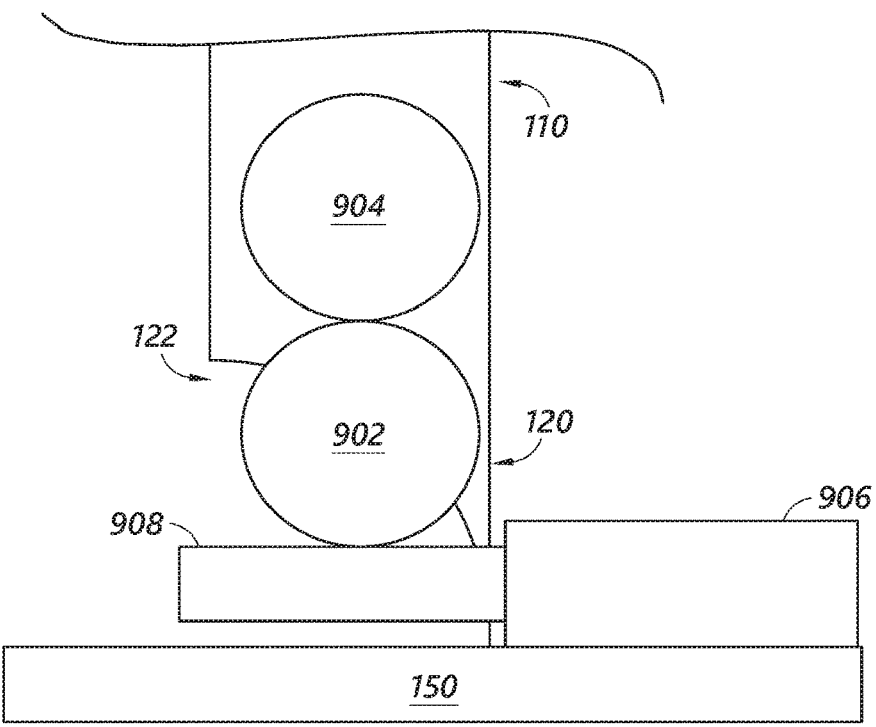
FIGS. 9A and 9B show cross-sectional illustrations of a pellet dispenser ejector according to further exemplary implementations.
Figure 9B:
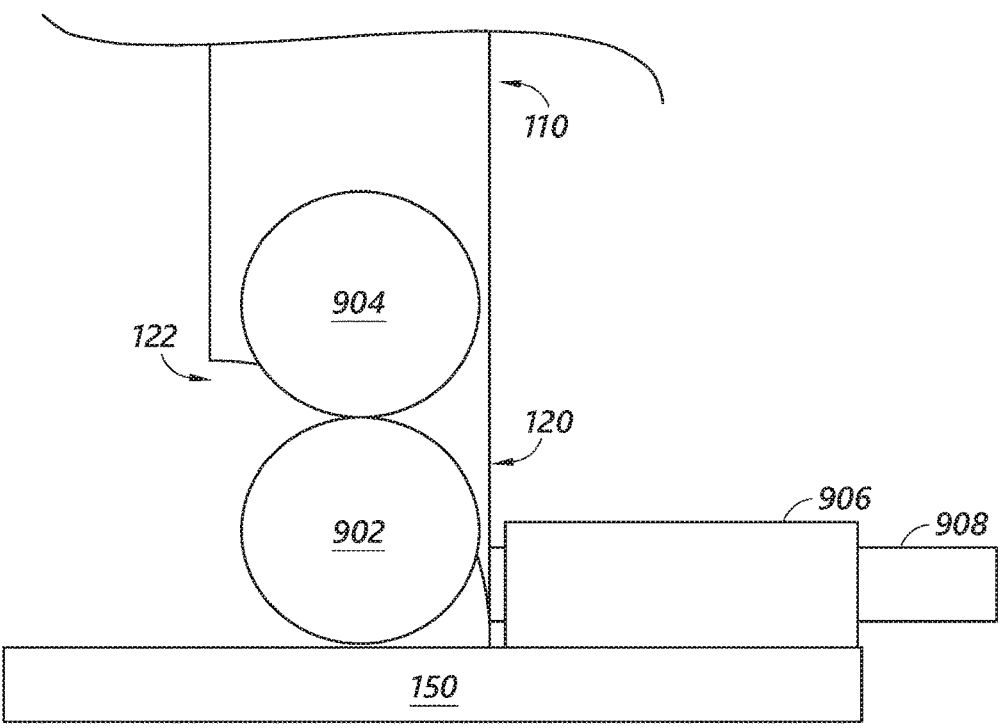

FIGS. 9A and 9B show cross-sectional illustrations of a pellet dispenser ejector according to further exemplary implementations. In FIG. 9A, two pellets 902 and 904 are shown. The bottom most pellet 902 rests against an ejector bar 908 of an ejector 906. Because the bottom most pellet is raised from the base 150, it cannot exit the ejector port 122 in the current state.

In FIG. 9B, the ejector bar 908 has been retracted such as in response to an activation message from a controller. As a result of retraction, the bottom most pellet 902 dropped down due to gravity and has sufficient clearance to exit the ejector port 122. When the ejector bar 908 is returned to the position shown in FIG. 9A, the ejector bar 908 will push the bottom most pellet 902 out of the ejector port 122 toward the chute and, ultimately, into the cage.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein, "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network location, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Methods disclosed herein may comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes, and variations may be made in the arrangement, operation, and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. A pellet dispenser for an animal cage for a small laboratory animal, the pellet dispenser comprising:
    a tube having a receiving end including a portal for receiving pellets and a dispensing end including an ejector port for dispensing pellets, wherein the tube includes a channel or window extending from the receiving end to the dispensing end, wherein at least a portion of the pellets within the tube is visible through the channel or window;
    an upper mounting element affixed to the tube, wherein the upper mounting element attaches at least a portion of the tube to a wall or a first structure of a cage; and
    a base affixed to the dispensing end of the tube, wherein the base includes:
        (i) a linear solenoid disposed to push a pellet at the dispensing end from within the tube through the ejector port, and
        (ii) a chute to receive the pellet pushed by the linear solenoid and direct the pellet into the cage.

2. The pellet dispenser of claim 1, wherein the linear solenoid includes a controller configured to receive a control message for activating the linear solenoid.

3. The pellet dispenser of claim 2, wherein the control message indicates at least one of a time to activate the linear solenoid, a duration for activating the linear solenoid, a number of times to activate the linear solenoid, or a delay between activations of the linear solenoid.

4. The pellet dispenser of claim 2, wherein the control message is received from a dispenser controller configured to concurrently transmit the control message to a plurality of pellet dispensers.

5. The pellet dispenser of claim 1, wherein the upper mounting element presents the receiving end of the tube for receiving pellets without direct contact with the cage.

6. The pellet dispenser of claim 1, wherein the base further includes a lower mounting element configured to attach at least a portion of the pellet dispenser to a second structure within the cage.

7. The pellet dispenser of claim 6, wherein the second structure within the cage comprises a feed hopper.

8. A pellet dispensing system comprising:
    a pellet dispenser including:
        a tube having a receiving end including a portal for receiving pellets and a dispensing end including an ejector port for dispensing pellets;
        an upper mounting element affixed to the tube, wherein the upper mounting element attaches at least a portion of the tube to a wall or first structure of a cage; and
        a base affixed to the dispensing end of the tube, wherein the base includes:
            (i) an ejector disposed to push a pellet at the dispensing end from within the tube through the ejector port, and
            (ii) a chute to receive the pellet pushed by the ejector and direct the pellet into the cage; and
    a pellet dispensing controller comprising a microcontroller configured by instructions stored in a memory, the instructions causing the pellet dispensing controller to:
        receive a control parameter for the pellet dispenser, wherein the control parameter indicates a time to activate the ejector of the pellet dispenser;
        determine that a current time corresponds to the time identified by the control parameter; and
        transmit an activation message to the ejector of the pellet dispenser.

9. The pellet dispensing system of claim 8, wherein the tube includes a channel or window extending from the receiving end to the dispensing end, wherein at least a portion of the pellets within the tube is visible through the channel or window.

10. The pellet dispensing system of claim 8, wherein the ejector includes a controller configured to receive the activation message for activating the ejector.

11. The pellet dispensing system of claim 10, wherein the activation message indicates at least one of a time to activate the ejector, a duration for activating the ejector, a number of times to activate the ejector, or a delay between activations of the ejector.

12. The pellet dispensing system of claim 8, wherein the ejector comprises a linear solenoid.

13. The pellet dispensing system of claim 8, wherein the pellet dispensing controller is configured to concurrently transmit the activation message to a plurality of pellet dispensers.

14. The pellet dispensing system of claim 8, wherein the upper mounting element presents the receiving end of the tube for receiving pellets without direct contact with an area of the cage housing a subject.

15. The pellet dispensing system of claim 8, wherein the base further includes a lower mounting element configured to attach at least a portion of the pellet dispenser to a second structure of the cage.

16. The pellet dispensing system of claim 15, wherein the second structure of the cage comprises a feed hopper.

17. The pellet dispensing system of claim 8, wherein the ejector comprises a gravity release.

\* \* \* \* \*